United States Patent
Zheng et al.

(10) Patent No.: US 10,666,562 B2
(45) Date of Patent: May 26, 2020

(54) NETWORK PATH COMPUTATION METHOD, APPARATUS, AND SYSTEM

(71) Applicant: Huawei Technologies Co., Ltd., Shenzhen (CN)

(72) Inventors: Haomian Zheng, Shenzhen (CN); Xian Zhang, Shenzhen (CN); Yi Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 5 days.

(21) Appl. No.: 15/236,347

(22) Filed: Aug. 12, 2016

(65) Prior Publication Data

US 2016/0352636 A1    Dec. 1, 2016

Related U.S. Application Data

(63) Continuation of application No. PCT/CN2014/072049, filed on Feb. 13, 2014.

(51) Int. Cl.
*H04L 12/721* (2013.01)
*H04L 12/733* (2013.01)
(Continued)

(52) U.S. Cl.
CPC ............ *H04L 45/70* (2013.01); *H04L 43/087* (2013.01); *H04L 45/20* (2013.01); *H04L 45/22* (2013.01);
(Continued)

(58) Field of Classification Search
CPC ....... H04L 45/70; H04L 43/087; H04L 45/20; H04L 45/50; H04L 45/22; H04L 45/44; H04L 45/28

See application file for complete search history.

(56) References Cited

U.S. PATENT DOCUMENTS 7,643,408 B2    1/2010  Atkinson et al.
8,787,154 B1 *  7/2014  Medved ................. H04L 45/64
                                                           370/225
(Continued)

FOREIGN PATENT DOCUMENTS

CN    101286892 A  * 10/2008
CN    102201972 A  *  9/2011

OTHER PUBLICATIONS

Zhang et al., Applicability of Stateful Path Computation Element (PCE), draft-zhang-pce-stateful-pce-app-04, May 24, 2013, IETF Network Working Group, Internet Draft.*

(Continued)

*Primary Examiner* — Shailendra Kumar
(74) *Attorney, Agent, or Firm* — Leydig, Voit & Mayer, Ltd.

(57) ABSTRACT

Embodiments of the present invention provide a network path computation method, apparatus and system, where the method includes: sending, by a first node, a path computation request to a first path computation element PCE, where the path computation request includes a resource sharing object, and a head node and a last node of a first label switched path LSP; and receiving, by the first node, a path computation result that is returned by the first PCE and that is obtained by means of computation according to the resource sharing object, and establishing a second path from the head node to the last node according to the path computation result. According to the network path computation method, apparatus, and system provided in the embodiments of the present invention, link resource utilization can be improved.

15 Claims, 9 Drawing Sheets

(51) Int. Cl.
- H04L 12/26 (2006.01)
- H04L 12/723 (2013.01)
- H04L 12/707 (2013.01)
- H04L 12/703 (2013.01)

(52) U.S. Cl.
CPC .............. *H04L 45/44* (2013.01); *H04L 45/50* (2013.01); *H04L 45/28* (2013.01)

(56) References Cited

U.S. PATENT DOCUMENTS

| | | | |
|---|---|---|---|
| 2007/0047469 A1 | 3/2007 | Vasseur et al. | |
| 2012/0076046 A1* | 3/2012 | Lin | H04L 12/40013 370/254 |
| 2015/0172171 A1* | 6/2015 | Beller | H04L 45/128 398/45 |
| 2015/0215200 A1* | 7/2015 | Bottari | H04Q 3/0079 370/228 |
| 2016/0094398 A1* | 3/2016 | Choudhury | H04L 45/42 370/254 |

OTHER PUBLICATIONS

Dharanikota et al., Inter-domain routing with Shared Risk Groups, draft-many-ccamp-srg-01, Dec. 2001, CCAMP Working Group, Internet Draft.*

Zhang et al., "Applicability of Stateful Path Computation Element (PCE)," Internet Draft, XP15093568, pp. 1-24, Network Working Group (Aug. 2013).

Oki et al., "Extensions to the Path Computation Element Communication Protocol (PCEP) for Route Exclusions," Network Working Group, Request for Comments: 5521, Category: Standards Track, pp. 1-16 (Apr. 2009).

Oki et al., "Framework for PCE-Based Inter-Layer MPLS and GMPLS Traffic Engineering," Network Working Group, Request for Comments: 5623, Category: Informational, pp. 1-34 (Sep. 2009).

"Inter-domain routing with Shared Risk Groups," CCAMP Working Group, Internet Draft, Document: draft-many-ccamp-srg-00.txt, pp. 1-18, IETF, Internet Engineering Task Force (Jul. 2001).

* cited by examiner

NETWORK PATH COMPUTATION METHOD, APPARATUS, AND SYSTEM

CROSS-REFERENCE TO RELATED APPLICATIONS

This application is a continuation of International Application No. PCT/CN2014/072049, filed on Feb. 13, 2014, which is hereby incorporated by reference in its entirety.

TECHNICAL FIELD

The present disclosure relates to network technologies, and in particular, to a network path computation method, apparatus, and system.

BACKGROUND

In a network technology, a path computation element (PCE for short) is a centralized path computation element, which is mainly used to implement complex path computation. The PCE generally has network resource information, including a topology, a node, and a current resource usage status. A main procedure of path computation is returning, after a request from a path computation client (PCC for short) is received, path information to the PCC by using a routing algorithm and with reference to available resources of a current network. To enrich a dynamic capability of the PCE, the IETF standardization organization further extends a function of the PCE, so that the PCE can acquire a label switched path (LSP for short). A PCE of this type is referred to as a stateful PCE. In addition, an LSP Delegation function is also defined for the PCE, that is, after the PCC grants a right of modifying an LSP to the PCE, the stateful PCE may modify the LSP when necessary, and instruct a corresponding PCC to perform corresponding LSP update.

In a transport network, when a service encounters a fault, rerouting is an important means to recover the service. Rerouting indicates that available route computation is performed again according to a resource distribution situation after the fault occurs, and service transmission is recovered. In the prior art, after the fault occurs, a head node sends a rerouting request to a PCE, requesting to compute a path, without releasing an original LSP connection. The PCE recomputes the path according to resource information (including a faulty LSP). When there is a path that meets a request, a computation result is returned; otherwise, a path computation failure is returned.

However, resource utilization of a rerouting method in the prior art is relatively low. In some extreme scenarios, for example, when there are relatively few available links in the network, and no available links except an original LSP link can form a path from a head node to a last node, a path computation failure is also caused, and a service cannot be recovered.

SUMMARY

Embodiments of the present invention provide a network path computation method, apparatus, and system, so as to improve link resource utilization.

According to a first aspect, an embodiment of the present invention provides a network path computation method, including:

sending, by a first node, a path computation request to a first path computation element (PCE), where the path computation request includes a resource sharing object, and a head node and a last node of a first label switched path (LSP); and receiving, by the first node, a path computation result that is returned by the first PCE and that is obtained by means of computation according to the resource sharing object, and establishing a second path from the head node to the last node according to the path computation result.

In a first possible implementation manner of the first aspect, before the sending, by a first node, a path computation request to a first path computation element (PCE), the method further includes:

determining, by the first node, that at least one link in a first label switched path LSP between a current head node and a current last node fails.

According to the first aspect or the first possible implementation manner of the first aspect, in a second possible implementation manner, the resource sharing object includes an identifier of the first label switched path (LSP) or an identifier of a normal link in the first label switched path (LSP).

According to the second possible implementation manner of the first aspect, in a third possible implementation manner, the resource sharing object further includes a sharing principle.

According to the third possible implementation manner of the first aspect, in a fourth possible implementation manner, the sharing principle includes either of the following: sharing as many links as possible is preferred; and a performance parameter is optimal in a case in which link sharing is ensured, where the performance parameter includes a delay, jitter, or a hop count.

According to any one of the first aspect and the first to the fourth possible implementation manners of the first aspect, in a fifth possible implementation manner, the path computation request further includes an include route object (IRO).

According to the first possible implementation manner of the first aspect, in a sixth possible implementation manner, the head node and the last node belong to a first-layer network, the first LSP between the head node and the last node includes at least one link that belongs to a second-layer network, and a head node of the link of the second-layer network is a third node;

the second path further includes at least one link in the second-layer network; and after the receiving, by the first node, a path computation result that is returned by the first PCE and that is obtained by means of computation according to the resource sharing object, and establishing a second path from the head node to the last node according to the path computation result, the method further includes:

marking, by the first node, the second path as a second LSP, and sending, to the third node, information indicating that the second path is marked as the second LSP, so that the third node sends a report message to a second PCE in the second-layer network after marking the link of the second-layer network as a third LSP, where the report message includes a mapping relationship indicating that the third LSP and the second LSP serve a same service.

According to a second aspect, an embodiment of the present invention provides a network path computation method, including:

receiving, by a first path computation element (PCE), a path computation request sent by a first node, where the path computation request includes a resource sharing object, and a head node and a last node of a first label switched path (LSP);

computing, by the first PCE, a second path from the head node to the last node according to the resource sharing object; and sending, by the first PCE, the second path to the first node, so that the first node establishes the second path from the head node to the last node according to a path computation result.

In a first possible implementation manner of the second aspect, the resource sharing object includes an identifier of the first label switched path (LSP) or an identifier of a normal link in the first label switched path (LSP).

According to the first possible implementation manner of the second aspect, in a second possible implementation manner, the resource sharing object further includes a sharing principle.

According to the second possible implementation manner of the second aspect, in a third possible implementation manner, the sharing principle includes either of the following: sharing as many links as possible is preferred; and a performance parameter is optimal in a case in which link sharing is ensured, where the performance parameter includes a delay, jitter, or a hop count.

According to any one of the first aspect and the first to third possible implementation manners of the second aspect, in a fourth possible implementation manner, the path computation request further includes an include route object (IRO).

In a fifth possible implementation manner of the second aspect, the computing, by the first PCE, a second path according to the resource sharing object includes:

determining, by the first PCE, that a link resource of a first-layer network in which the first node and a second node are located is insufficient to establish the second path; and sending, by the first PCE to a second PCE in a second-layer network, a request for establishing a third path, where the request includes the resource sharing object, the third path is used to form the second path, and the third path includes at least one link of the second-layer network.

According to a third aspect, an embodiment of the present invention provides a network path computation method, including:

receiving, by a second path computation element (PCE) in a second-layer network, a request for establishing a third path that is sent by a first PCE in a first-layer network, where the request includes a resource sharing object, and a head node and a last node in the second-layer network, the third path is used to form a second path, the third path includes at least one link of the second-layer network, and the second path further includes at least one link of the first-layer network; and determining, by the second PCE, a shared target according to the resource sharing object and a mapping relationship between a link resource of the second-layer network and a link resource of the first-layer network, and determining the third path according to the shared target.

In a first possible implementation manner of the third aspect, before the determining, by the second PCE, a shared target according to the resource sharing object and a mapping relationship between a link resource of the first-layer network and a link resource of the second-layer network, the method further includes:

receiving, by the second PCE, a request for establishing a fourth path that is sent by the first PCE, where the fourth path is used to form a first path, the fourth path includes at least one link of the second-layer network, a head node of the second-layer network in the fourth path is a third node, and the first path further includes at least one link of the first-layer network;

determining, by the second PCE, the fourth path according to the request, and returning, to the first PCE, a message indicating that the fourth path is successfully computed;

establishing, by the second PCE, the fourth path, where the fourth path is marked as a fourth LSP;

receiving, by the second PCE, a report message sent by the third node, where the report message includes information indicating that the first path is marked as a first LSP; and establishing, by the second PCE, a mapping relationship indicating that the fourth LSP and the first LSP serve a same service, or receiving, by the second PCE, a mapping relationship that is sent by the third node and that indicates that the fourth LSP and the first LSP corresponding to the first path serve a same service.

According to the third aspect or the first possible implementation manner of the third aspect, in a second possible implementation manner, the mapping relationship between the link resource of the first-layer network and the link resource of the second-layer network is stored in an LSP database of the second-layer network.

According to a fourth aspect, an embodiment of the present invention provides a network path computation apparatus, including:

a sending module, configured to send a path computation request to a first path computation element (PCE), where the path computation request includes a resource sharing object, and a head node and a last node of a first label switched path (LSP); and a receiving module, configured to receive a path computation result that is returned by the first PCE and that is obtained by means of computation according to the resource sharing object, and establish a second path from the head node to the last node according to the path computation result.

In a first possible implementation manner of the fourth aspect, the apparatus further includes:

a processing module, configured to determine, before the sending module sends a path computation request to a path computation element (PCE), that at least one link in a first label switched path (LSP) between a current head node and a current last node fails.

According to the fourth aspect or the first possible implementation manner of the fourth aspect, in a second possible implementation manner, the resource sharing object includes an identifier of the first label switched path (LSP) or an identifier of a normal link in the first label switched path (LSP).

According to the second possible implementation manner of the fourth aspect, in a third possible implementation manner, the resource sharing object further includes a sharing principle.

According to the third possible implementation manner of the fourth aspect, in a fourth possible implementation manner, the sharing principle includes either of the following: sharing as many links as possible is preferred; and a performance parameter is optimal in a case in which link sharing is ensured, where the performance parameter includes a delay, jitter, or a hop count.

According to any one of the fourth aspect and the first to the fourth possible implementation manners of the fourth aspect, in a fifth possible implementation manner, the path computation request further includes an include route object IRO.

According to the first possible implementation manner of the fourth aspect, in a sixth possible implementation manner, the head node and the last node belong to a first-layer network, the first LSP between the head node and the last node includes at least one link that belongs to a second-layer network, and a head node of the link of the second-layer network is a third node;

the second path further includes at least one link in the second-layer network; and the processing module is further configured to mark the second path as a second LSP, and the sending module is further configured to send, to the third node, information indicating that the second path is marked as the second LSP, so that the third node sends a report message to a second PCE in the second-layer network after marking the link of the second-layer network as a third LSP, where the report message includes a mapping relationship indicating that the third LSP and the second LSP serve a same service.

According to a fifth aspect, an embodiment of the present invention provides a network path computation apparatus, including:

a receiving module, configured to receive a path computation request sent by a first node, where the path computation request includes a resource sharing object, and a head node and a last node of a first label switched path (LSP);

a processing module, configured to compute a second path from the head node to the last node according to the resource sharing object; and a sending module, configured to send the second path to the first node, so that the first node establishes the second path from the head node to the last node according to a path computation result.

In a first possible implementation manner of the fifth aspect, the resource sharing object includes an identifier of the first label switched path (LSP) or an identifier of a normal link in the first label switched path (LSP).

According to the first possible implementation manner of the fifth aspect, in a second possible implementation manner, the resource sharing object further includes a sharing principle.

According to the second possible implementation manner of the fifth aspect, in a third possible implementation manner, the sharing principle includes either of the following: sharing as many links as possible is preferred; and a performance parameter is optimal in a case in which link sharing is ensured, where the performance parameter includes a delay, jitter, or a hop count.

According to any one of the fifth aspect and the first to the third possible implementation manners of the fifth aspect, in a fourth possible implementation manner, the path computation request further includes an include route object (IRO).

In a fifth possible implementation manner of the fifth aspect, the processing module is specifically configured to:

determine that a link resource of a first-layer network in which the first node and a second node are located is insufficient to establish the second path; and send, to a second PCE in a second-layer network, a request for establishing a third path, where the request includes the resource sharing object, the third path is used to form the second path, and the third path includes at least one link of the second-layer network.

According to a sixth aspect, an embodiment of the present invention provides a network path computation apparatus, including:

a receiving module, configured to receive a request for establishing a third path that is sent by a first PCE in a first-layer network, where the request includes a resource sharing object, and a head node and a last node in a second-layer network, the third path is used to form a second path, the third path includes at least one link of the second-layer network, and the second path further includes at least one link of the first-layer network; and a processing module, configured to determine a shared target according to the resource sharing object and a mapping relationship between a link resource of the second-layer network and a link resource of the first-layer network, and determine the third path according to the shared target.

In a first possible implementation manner of the sixth aspect, the receiving module is further configured to receive, before the processing module determines the shared target according to the resource sharing object and the mapping relationship between the link resource of the first-layer network and the link resource of the second-layer network, a request for establishing a fourth path that is sent by the first PCE, where the fourth path is used to form a first path, the fourth path includes at least one link of the second-layer network, a head node of the second-layer network in the fourth path is a third node, and the first path further includes at least one link of the first-layer network;

the processing module is further configured to determine the fourth path according to the request, and return, to the first PCE, a message indicating that the fourth path is successfully computed;

the processing module is further configured to establish the fourth path, where the fourth path is marked as a fourth LSP;

the receiving module is further configured to receive a report message sent by the third node, where the report message includes information indicating that the first path is marked as a first LSP; and the processing module is further configured to establish a mapping relationship indicating that the fourth LSP and the first LSP serve a same service, or the receiving module is further configured to receive a mapping relationship that is sent by the third node and that indicates that the fourth LSP and the first LSP corresponding to the first path serve a same service.

According to the sixth aspect or the first possible implementation manner of the sixth aspect, in a second possible implementation manner, the mapping relationship between the link resource of the first-layer network and the link resource of the second-layer network is stored in an LSP database of the second-layer network.

According to a seventh aspect, an embodiment of the present invention provides a network path computation system, including: a path computation client (PCC) in which the network path computation apparatus in the embodiment shown in FIG. 6 or FIG. 7 is disposed or the first node in the embodiment shown in FIG. 10, and a path computation element (PCE) in which the network path computation apparatus described in the embodiment shown in FIG. 8 is disposed or the first PCE in the embodiment shown in FIG. 11.

According to an eighth aspect, an embodiment of the present invention provides a network path computation system, including: a path computation client (PCC) in which the network path computation apparatus in the embodiment shown in FIG. 6 or FIG. 7 is disposed or the first node in the embodiment shown in FIG. 10, a first path computation element (PCE) that is located in a first-layer network and in which the network path computation apparatus in the embodiment shown in FIG. 8 is disposed or the first PCE in the embodiment shown in FIG. 11, and a second PCE that is located in a second-layer network and in which the network path computation apparatus in the embodiment shown in FIG. 9 is disposed or the second PCE in the embodiment shown in FIG. 12.

According to the network path computation method, apparatus, and system provided in the embodiments of the present invention, a resource sharing object is added to a path computation request sent by a first node to a PCE, so as to declare an object that needs to be shared; and the PCE computes a path according to the resource sharing object, that is, when computing the path, the PCE may reuse an original link resource or a link resource in a fault-free section in a faulty path. In this way, link resource utilization can be improved, and in a scenario of few available link resources in a network, a path computation success rate can be improved.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

FIG. 3B is applied;

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The present invention provides a path computation method that supports a sharing policy, which allows an existing link or LSP to be shared in a path computation process. The sharing policy is a policy of rerouting after a service encounters a fault, and the policy allows reusing a part of resources of the service currently affected by the fault. For example, one LSP includes four nodes A, B, C, D and links between the nodes. When the link between C and D fails, the LSP fails, but A-B and B-C are fault-free sections, and the like. In this case, the sharing policy allows reusing the A-B and B-C links in the LSP.

In addition, the method in this embodiment of the present invention can support interaction between multiple PCEs, thereby implementing resource sharing when a cross-layer and cross-domain path is computed.

Figure 1:
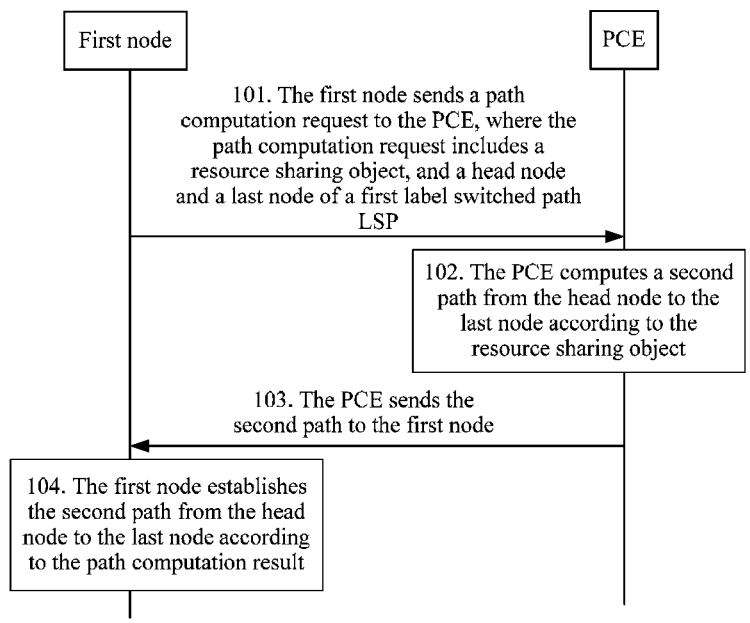
FIG. 1 is a signaling flowchart of Embodiment 1 of a path computation method according to the present invention.

FIG. 1 is a signaling flowchart of Embodiment 1 of a path computation method according to the present invention. This embodiment is applicable to a single-layer network scenario. As shown in FIG. 1, the method in this embodiment is completed by a PCE and a first node by means of interaction. The method in this embodiment may include the following steps:

Step 101: A first node sends a path computation request to a PCE, where the path computation request includes a resource sharing object, and a head node and a last node of a first label switched path LSP.

The first node may be a head node, or may be another node. FIG. 1 shows only a case in which the first node is a head node. In this case, the first node serves as a path computation client (PCC for short).

In a specific implementation process, the PCC initiates the path computation request by sending a PCReq message to the PCE, where the PCC is not limited to any device, and may be a node, a controller, or another PCE.

The path computation request may be a PCReq command.

Preferably, the method in this embodiment may be applied to a scenario of rerouting after an original link between the head node and the last node fails, for example, a scenario in which a first path from the head node to the last node fails. The foregoing step 101, that is, a process in which the first node requests rerouting from the PCE, differs from the prior art in that the path computation request includes the resource sharing object (RSO for short), and the resource sharing object may include an identifier of the first label switched path LSP or an identifier of a normal link in the first label switched path LSP.

Further, the resource sharing object may further include a sharing principle, and the sharing principle may include either of the following: sharing as many links as possible is preferred; some specific performance parameters (parameters such as a delay, jitter, and a hop count) are optimal in a case in which link sharing is ensured. In addition, the sharing policy may coexist with other policies (such as bandwidth throttling and delay limitation).

Step 102: The PCE computes a second path from the head node to the last node according to the resource sharing object.

Specifically, after receiving the path computation request that includes the RSO, the PCE may preferentially consider a choice from routes shared with a specified object, and return a computation result; when the sharing policy cannot be met, but there is still an available resource between the head node and the last node (a source node and a sink node), return a computation result of non-sharing; and when a requirement for a resource between the source node and the sink node cannot be met regardless of whether the sharing policy is met, return a result indicating a path computation failure.

Step 103: The PCE sends the second path to the first node.

Step 104: The first node establishes the second path from the head node to the last node according to the path computation result.

In specific implementation, a method for establishing the second path is not necessarily completed by the first node, and another manner may be used. For example, the method may also be as follows: The PCE sends a path establishment instruction to each node in the second path, and each node establishes a respective connection after receiving the instruction.

It should be noted that the PCE in this embodiment may be a PCE in a single-layer network, or may be a PCE in a network at a specific layer in a multi-layer network scenario, for example, a first PCE or a second PCE described in a subsequent embodiment.

Figure 2:
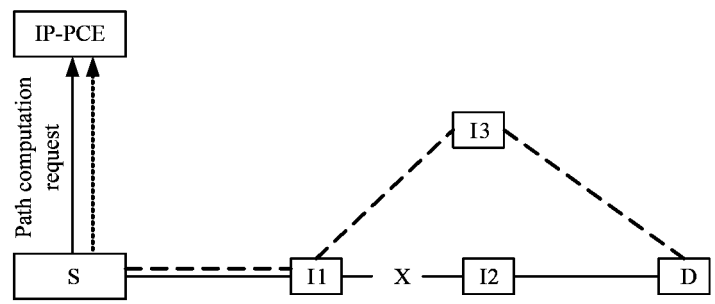
FIG. 2 is a schematic structural diagram of a network to which a method embodiment shown in FIG. 1 is applied.

The following describes the method in this embodiment in detail with reference to a specific network. FIG. 2 is a schematic structural diagram of a network to which a method embodiment shown in FIG. 1 is applied. As shown in FIG. 2, the network includes at least one PCE, and S, I1, I2, and D are nodes in the network. When a service from the node S to the node D needs to be established, the head node S initiates a path computation request to the PCE to request to establish the service from the node S to the node D, and the PCE computes a path and returns a result indicating that a working path of the service is S-I1-I2-D, and an LSP of the path is marked as a first LSP. However, when a fault occurs in an I1-I2 section, the first node S senses the fault, and then initiates a rerouting request to the PCE. If a path computation method in the prior art is used, because resource sharing is not supported in the prior art, and in this case, available link resources are I1-I3 and I3-D, which are insufficient to form the service from the node S to the node D, the PCE returns, to the first node S, a result indicating a path computation failure.

However, according to the method in this embodiment, because the path computation request in step 101 includes a second node and a resource sharing object, in the network shown in FIG. 2, the resource sharing object may be specified as a first LSP, and sharing a resource with the first LSP is required. Specifically, the resource sharing object may include an identifier of a resource that needs to be shared, that is, a first LSP1, which may also be expressed in another form, provided that the shared resource is specified. In addition to specifying the shared resource as the first LSP, the RSO may further specify a sharing principle. The sharing principle includes but is not limited to: it is required that sharing as many links as possible be preferred; and another performance parameter is optimal in a case in which link sharing is ensured, where the performance parameter includes but is not limited to a delay, jitter, and a hop count. If the sharing policy is that sharing as many links as possible is preferred, an available path having a relatively high degree of sharing with a specified object is preferentially selected. For example, there are two available paths: one shares three hops with an original path, and the other shares two hops; in this case, the path sharing three hops is preferentially selected.

In step 102 in which the PCE computes a second path from the head node to the last node according to the resource sharing object, a fault-free section in the first LSP may be reused, that is, a section S-I1 and a section I2-D may be reused. With reference to a current resource usage status, the PCE may also query an LSP database to obtain a preferred path S-I1-I3-D. This path has resource sharing with the first LSP in the section S-I1. After this path is established, a corresponding LSP may be marked as a second LSP.

Similarly, for the network shown in FIG. 2, if a service needs to be switched back after a fault in I1-I2 is rectified, the switchback may also be implemented by using the method in the embodiment shown in FIG. 1. In specific implementation, after the fault occurs in I1-I2 and rerouting is complete, the node S may periodically send a path computation request (PCReq instruction) to the PCE, where the path computation request may include an include route object (IRO for short), and the IRO refers to an object that is "necessarily included". This embodiment is applied to the network shown in FIG. 2. The IRO may be specified as a first LSP, representing that an LSP1 is an include path for recovery; the RSO may be specified as an LSP2, indicating that sharing with the LSP2 is allowed. In this way, before the fault in I1-I2 disappears, the PCE fails to compute a path, and returns a path computation failure message to the node S; when the fault in I1-I2 disappears, the PCE returns a path computation success to the node S.

In this embodiment, a resource sharing object is added to a path computation request sent by a first node to a PCE, so as to declare an object that needs to be shared; and the PCE computes a path according to the resource sharing object, that is, when computing the path, the PCE may reuse an original link resource or a link resource in a fault-free section in a faulty path. In this way, link resource utilization can be improved, and in a scenario of few available link resources in a network, a path computation success rate can be improved.

It should be noted that in specific implementation, when the first node determines that a link resource does not need to be shared, the RSO in the path computation request may be omitted by default.

The path computation method in the present invention may also be applied to a multi-layer network scenario. A multi-layer network is an application of a transport network nowadays. Typical scenarios include an Internet Protocol (IP for short) layer, an optical layer, and the like. In the multi-layer network scenario, the IP layer and the optical layer each have a PCE that is responsible for path computation. It should be noted that because a service path in the foregoing embodiment relates only to a single-layer network, if the service path corresponds to the multi-layer network, the PCE in the foregoing embodiment may correspond to a first PCE in a first-layer network, or may correspond to a second PCE in a second-layer network, or may correspond to a PCE at another layer, which is not limited in the present invention.

In the multi-layer network scenario, when it is found that resources are insufficient to establish a service, the IP layer may request path computation from a PCE at the optical layer, and use resources of the optical layer to complete establishment of the service. In this scenario, a PCE at the IP layer and a PCE at the optical layer need to perform cooperative computation. In this case, after two PCEs in networks at two layers separately complete path computation, and after head nodes in the networks at two layers and a corresponding node in a network on another side separately establish a path, a PCE in the second-layer network (that is, a second PCE) or a head node of the second-layer network needs to establish a mapping relationship between the two paths, to declare that the two paths serve a same service, so that a sharing policy can be used according to the mapping relationship in a subsequent cross-layer path computation process.

Specifically, the head node and the last node belong to a first-layer network, the first LSP between the head node and the last node includes at least one link that belongs to a second-layer network, and a head node of the link of the second-layer network is a third node.

The second path after rerouting further includes the at least one link of the second-layer network.

After the foregoing step 104, the method may further include:

marking, by the first node, the second path as a second LSP, and sending, to the third node, information indicating that the second path is marked as the second LSP, so that the third node sends a report message to a second PCE in the second-layer network after marking the link of the second-layer network as a third LSP, where the report message includes a mapping relationship indicating that the third LSP and the second LSP serve a same service.

In this way, in a subsequent rerouting process, after the second PCE receives a path computation request that includes an RSO, if the RSO is the second LSP, the second PCE may determine a shared target in the second-layer network as the third LSP according to the mapping relationship.

Figure 3A:
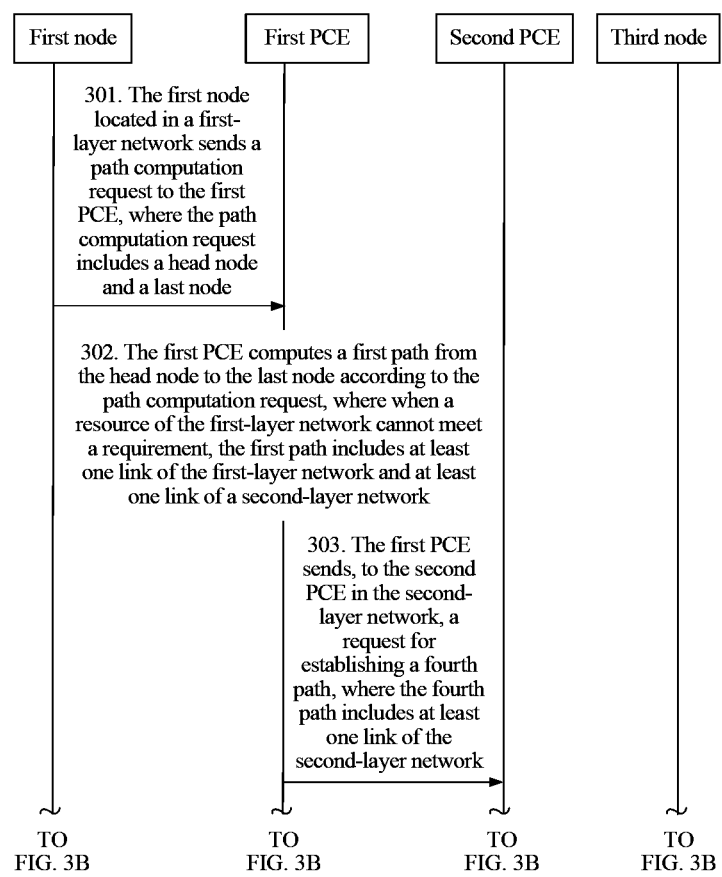
FIG. 3A and FIG. 3B are a signaling flowchart of Embodiment 2 of a path computation method according to the present invention.
Figure 3B:
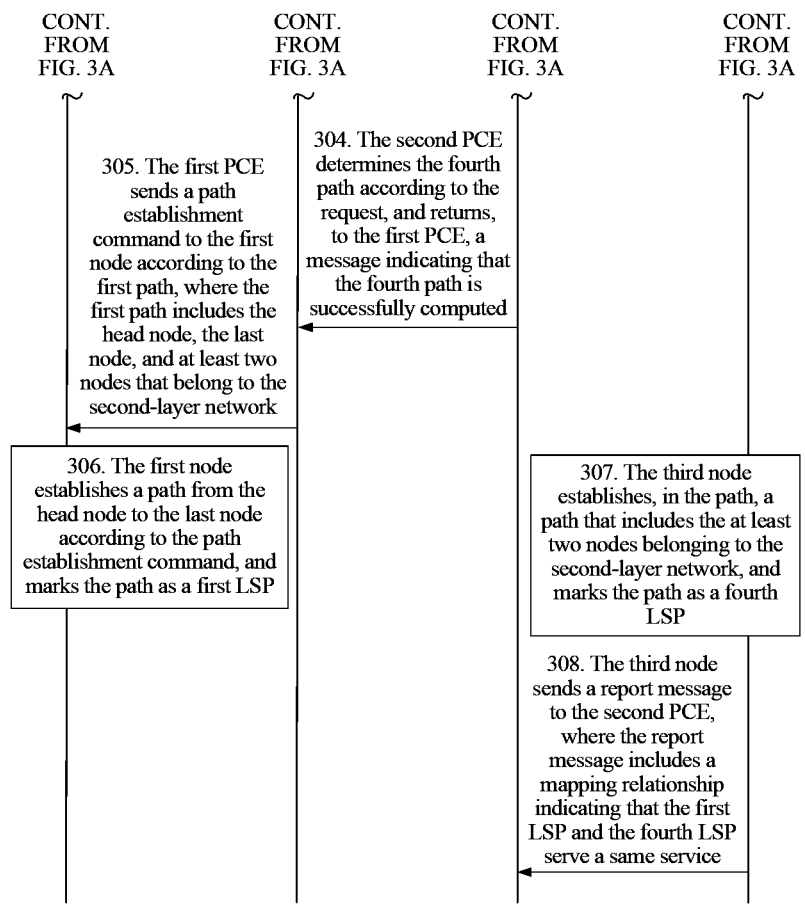

FIG. 3A and FIG. 3B are a signaling flowchart of Embodiment 2 of a path computation method according to the present invention. In this embodiment, both a head node and a last node are located in a first-layer network; however, when computing a path between the head node and the last node, a first PCE in the first-layer network needs to use a link that belongs to a second-layer network. The method in this embodiment is completed, by means of interaction, by the first PCE in the first-layer network, the head node located in the first-layer network, a second node and a third node that are interaction nodes of the first-layer network and the second-layer network, and a second PCE in the second-layer network, where the second node is located in the first-layer network and the third node is located in the second-layer network. This embodiment describes a process in which the head node and the last node establish a cross-layer path for the first time, and establish a mapping relationship between link resources of networks at two layers. As shown in FIG. 3A and FIG. 3B, the method in this embodiment may include the following steps:

Step 301: A first node located in a first-layer network sends a path computation request to a first PCE, where the path computation request includes a head node and a last node.

The first node may be the head node, or may be another node or another PCC. FIG. 3A and FIG. 3B or this embodiment shows only a case in which the first node is the head node.

Step 302: The first PCE computes a first path from the head node to the last node according to the path computation request, where when a resource of the first-layer network cannot meet a requirement, the first path includes at least one link of the first-layer network and at least one link of a second-layer network.

In specific implementation, the first PCE may compute a head node and a last node of the at least one link of the second-layer network, and a node that is in the first-layer network and that is connected to the head node and the last node of the link of the second-layer network, but cannot acquire a path between the head node and the last node of the link of the second-layer network. For ease of description, in this embodiment, the path is referred to as a fourth path.

Step 303: The first PCE sends, to a second PCE in the second-layer network, a request for establishing a fourth path, where the fourth path includes at least one link of the second-layer network.

Step 304: The second PCE determines the fourth path according to the request, and returns, to the first PCE, a message indicating that the fourth path is successfully computed.

Step 305: The first PCE sends a path establishment command to the first node according to the first path, where the first path includes the head node, the last node, and at least two nodes that belong to the second-layer network.

A node that is of the at least two nodes of the second-layer network and that is connected to a node in the first-layer network is a third node, and the third node may be referred to as a head node in the second-layer network.

Step 306: The first node establishes a path from the head node to the last node according to the path establishment command, and marks the path as a first LSP.

The first LSP is the first path. In specific implementation, a method for establishing the first path is not necessarily completed by the first node, and another manner may be used. For example, the method may also be as follows: The first PCE sends a path establishment instruction to each node that is in the first path and that belongs to the first-layer network, and each node establishes a respective connection after receiving the instruction.

In addition, in specific implementation, the first path may also be marked as the first LSP by the first PCE or another node. In addition, after step 306, a first-layer network node (the node may be the first node, or may be another node) connected to the third node needs to send, to the third node, a message indicating that the first path is marked as the first LSP.

Step 307: The third node establishes, in the path, a path that includes the at least two nodes belonging to the second-layer network, and marks the path as a fourth LSP.

The fourth LSP is a fourth path. In specific implementation, a method for establishing the fourth path is not necessarily completed by the third node, and another manner may be used. For example, the method may also be as follows: The second PCE sends a path establishment instruction to each node that is in the fourth path and that belongs to the second-layer network, and each node establishes a respective connection after receiving the instruction.

Step 308: The third node sends a report message to the second PCE, where the report message includes a mapping relationship indicating that the first LSP and the fourth LSP serve a same service.

In specific implementation, in addition to using the method of step 308, the mapping relationship indicating that the first LSP and the fourth LSP serve the same service may also be established by the second PCE.

Specifically, the report message may be forwarded to the second PCE by a node in the first-layer network by using the third node.

Figure 4:
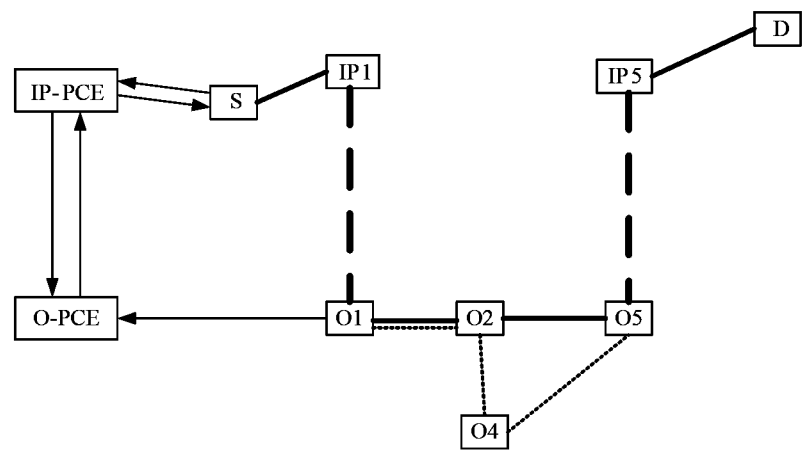
FIG. 4 is a schematic structural diagram of a network to which a method embodiment shown in FIG. 3A

The following describes this embodiment in detail with reference to a specific cross-layer network. FIG. 4 is a schematic structural diagram of a network to which a method embodiment shown in FIG. 3A and FIG. 3B is applied. In FIG. 4, a first-layer network is an IP layer, a first PCE is an IP-PCE, a second-layer network is an optical layer, and a second PCE is an O-PCE. Path computation at the IP layer and the optical layer is respectively performed by the IP-PCE and the optical-PCE (O-PCE). In addition, two PCEs may transfer a path computation request and return a result by using the PCEP. In this embodiment, a head node is a node S, and a last node is a node D. An example in which the head node S requests the PCE at the IP layer to establish a path from the node S to the node D is used to describe a cross-layer path computation process, and lays a basis for subsequent computation of a shared path.

Computation and establishment of a cross-layer path require the following steps:

In step 301, the node S sends a path computation request to the first PCE (IP-PCE), and the last node is set as D. A resource sharing object may not be specified in this step.

In step 302, the IP-PCE determines that IP1-IP5 in a first path from a head node to a last node needs to be a link of an optical layer network.

In step 303, the IP-PCE requests an IP1-IP5 path from the O-PCE. In this case, the resource sharing object may also not be specified.

In step 304, the O-PCE determines, by means of computation, that an optical layer path (a fourth path) corresponding to the IP1-IP5 path is O1-O2-O5, and notifies the IP-PCE of an optical layer path computation success. The O1 is a head node of a path of a second-layer network, that is, a third node. The IP1 is a node that is in a path of a first-layer network and that is connected to the head node of the path of the second-layer network.

In step 305, the IP-PCE delivers a path establishment command to the node S, where a route is S-IP1-(O1-O5)-IP5-D, that is, the first path is S-IP1-(O1-O5)-IP5-D.

In step 306, the node S establishes the first path, and marks the first path as a first LSP.

In step 307, the IP1 instructs the third node O1 to establish an optical layer link, that is, a fourth path, and marks the fourth path as a fourth LSP.

In step 308, the IP1 forwards a report message (PCRpt) to the O-PCE by using the O1, to declare a mapping relationship indicating that the first LSP (or an IP1-IP5 link) and the fourth LSP (or an O1-O2-O5 link) serve a same service. The mapping relationship may be stored in an LSP Database of the O-PCE, where the mapping relationship may be that the first LSP corresponds to the fourth LSP, or the (IP1-IP5) link corresponds to the fourth LSP. In specific implementation, when the IP1 and the O1 are a same device, the foregoing relationship may be directly sent to the O-PCE by the O1; when the IP1 and the O1 are different devices, the foregoing relationship is sent to the O-PCE by the IP1 via the O1.

So far, establishment of a cross-layer path is complete, and a mapping relationship between link resources is also stored in the O-PCE.

According to the path establishment method in this embodiment, when a path is established, a mapping relationship between a link of a first-layer network and a link of a second-layer network is saved, which may be used for subsequent sharing policy-based path computation. A specific method is described in detail in the following Embodiment 3 of a path computation method.

Figure 5A:
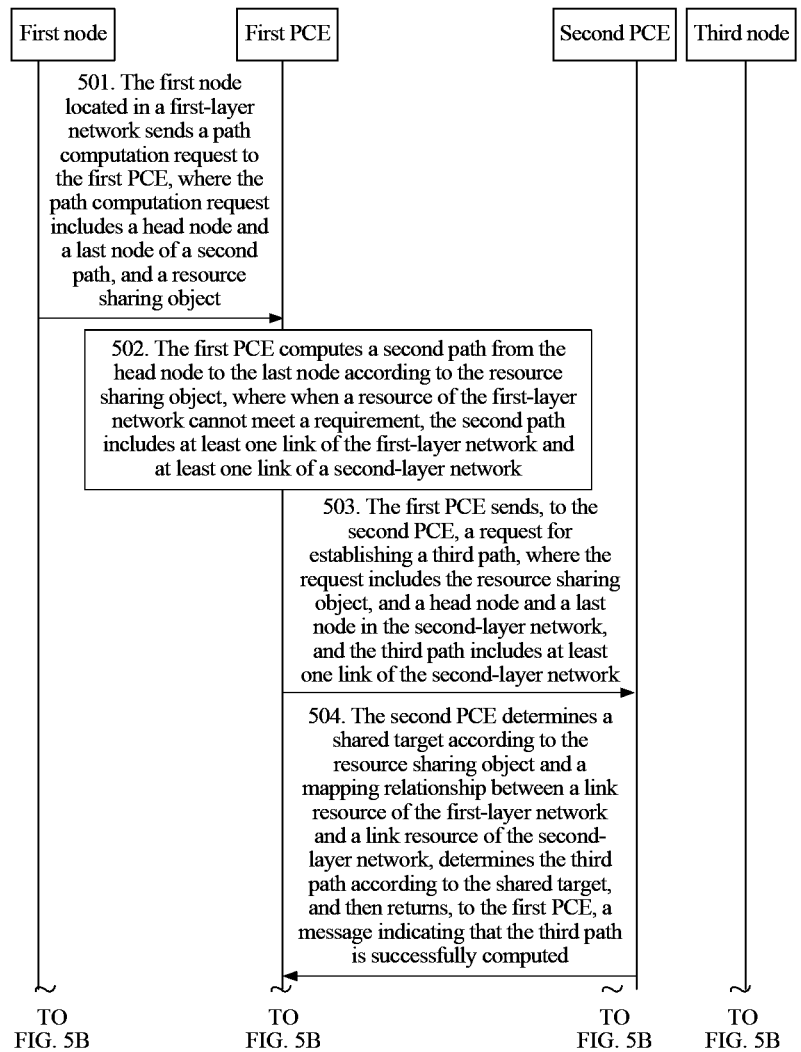
FIG. 5A and FIG. 5B are a signaling flowchart of Embodiment 3 of a path computation method according to the present invention.
Figure 5B:
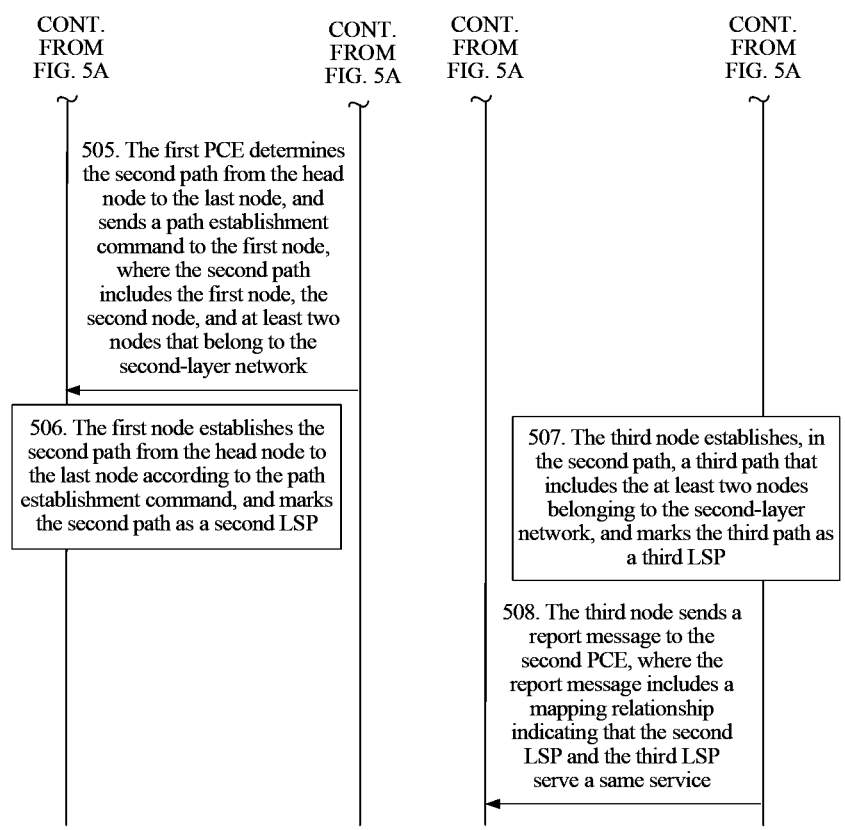

FIG. 5A and FIG. 5B are a signaling flowchart of Embodiment 3 of a path computation method according to the present invention. A method for rerouting according to a mapping relationship between link resources in a cross-layer network is described in this embodiment. This embodiment is applicable to a scenario in which a path needs to be re-established after a fault occurs in a cross-layer path in a multi-layer network. For example, after the embodiment shown in FIG. 3A and FIG. 3B is complete, and after a fault occurs in a first path or a fourth path, the method in this embodiment may be used to perform rerouting. As shown in FIG. 5A and FIG. 5B, the method in this embodiment may include the following steps:

Step 501: A first node located in a first-layer network sends a path computation request to a first PCE, where the path computation request includes a head node and a last node of a second path, and a resource sharing object.

In this embodiment, step 501 is triggered when the head node senses a fault of a first path between a current head node and a current last node. With reference to a network structure shown in FIG. 4, that is, S-IP1-(O1-O5)-IP5-D, for ease of description, it is assumed herein that the fault of the first path is specifically that an O2-O5 optical link encounters a fault, after sensing the fault, a node S requests rerouting (an example of rerouting with "a same source node and a same sink node" is used in this embodiment for description; actually, the rerouting may be rerouting with a same source node but a different sink node, with a different source node but a same sink node, or with a different source node and a different sink node) from an IP-PCE, and computes a second path from the node S to a node D.

The first node may be the head node, or may be another node or another PCC. FIG. 5A and FIG. 5B show only a case in which the first node is the head node.

Step 502: The first PCE computes the second path from the head node to the last node according to the resource sharing object, where when a resource of the first-layer network cannot meet a requirement, the second path includes at least one link of the first-layer network and at least one link of a second-layer network.

With reference to FIG. 4, the second path may be S-IP1-(O1-O5)-IP4-IP5-D, where O1-O5 is a link of the second-layer network, and a specific path of O1-O5 needs to be computed by a PCE at an optical layer.

Step 503: The first PCE sends, to the second PCE, a request for establishing a third path, where the request includes the resource sharing object, and a head node and a last node in the second-layer network, and the third path includes at least one link of the second-layer network.

With reference to FIG. 4 and Embodiment 2 of the path computation method in the present invention, the resource sharing object may be a first LSP (or an IP1-IP5 link).

Step 504: The second PCE determines a shared target according to the resource sharing object and a mapping relationship between a link resource of the first-layer network and a link resource of the second-layer network, determines the third path according to the shared target, and then returns, to the first PCE, a message indicating that the third path is successfully computed.

In an example shown in FIG. 4, according to Embodiment 2 of the foregoing path computation method, the second PCE may determine that the first LSP or the IP1-IP5 link corresponds to a fourth LSP at an optical layer or an O1-O2-O5 link at an optical layer; therefore, a fault-free O1-O2 link may be shared, and the second PCE may determine that the third path is O1-O2-O4-O5.

Step 505: The first PCE determines the second path from the head node to the last node, and sends a path establishment command to the first node, where the second path includes the first node, the second node, and at least two nodes that belong to the second-layer network.

A node that is a first node of the at least two nodes of the second-layer network and that is connected to a node in the first-layer network is a third node, and the third node is a head node of the second-layer network in the second path. For example, with reference to FIG. 4, interconnections between nodes of the first-layer network and the second-layer network are a connection between IP1 and O1 and a connection between IP5 and O5, and O1 is the head node of the second-layer network in the second path; therefore, the third node is O1.

In the example shown in FIG. 4, the second path may be: S-IP1-(O1-O5)-IP5-D.

Step 506: The first node establishes the second path from the head node to the last node according to the path establishment command, and marks the second path as a second LSP.

In addition, in specific implementation, the second path may also be marked as the second LSP by the first PCE or another node. In addition, after step 506, a first-layer network node (the node may be the first node, or may be another node) connected to the third node needs to send, to the third node, a message indicating that the first path is marked as the first LSP.

Step 507: The third node establishes, in the second path, a third path that includes the at least two nodes belonging to the second-layer network, and marks the third path as a third LSP.

In specific implementation, the third node may establish the third path according to an instruction of the second PCE. The instruction may be sent by the first PCE to the second PCE.

Alternatively, the third path may be marked as the third LSP by the second PCE or another node.

For the example shown in FIG. 4, the third path may be: IP1-O1-O2-O4-O5-IP5.

Step 508: The third node sends a report message to the second PCE, where the report message includes a mapping relationship indicating that the second LSP and the third LSP serve a same service.

In specific implementation, the mapping relationship indicating that the second LSP and the third LSP serve the same service may also be established by the second PCE.

According to the method in this embodiment, based on an existing mapping relationship between a link of a first-layer network and a link of a second-layer network, path computation with a sharing policy can be performed in a cross-layer scenario.

Figure 6:
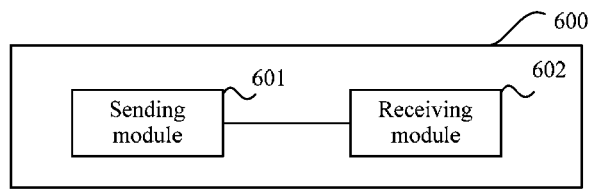
FIG. 6 is a schematic structural diagram of Embodiment 1 of a network path computation apparatus according to the present invention.

FIG. 6 is a schematic structural diagram of Embodiment 1 of a network path computation apparatus according to the present invention. The network path computation apparatus in this embodiment may be disposed on a first node, or may be a first node itself. As shown in FIG. 6, an apparatus 600 in this embodiment may include: a sending module 601 and a receiving module 602.

The sending module 601 is configured to send a path computation request to a first path computation element PCE, where the path computation request includes a resource sharing object, and a head node and a last node of a first label switched path LSP.

The receiving module 602 is configured to receive a path computation result that is returned by the first PCE and that is obtained by means of computation according to the resource sharing object, and establish a second path from the head node to the last node according to the path computation result.

Further, the resource sharing object includes an identifier of the first label switched path LSP or an identifier of a normal link in the first label switched path LSP.

Further, the resource sharing object further includes a sharing principle.

Further, the sharing principle includes either of the following: sharing as many links as possible is preferred; and a performance parameter is optimal in a case in which link sharing is ensured, where the performance parameter includes but is not limited to a delay, jitter, or a hop count.

The apparatus in this embodiment may be used to execute the technical solution that is executed by the corresponding first node in the method embodiment shown in FIG. 1, and the implementation principles of the technical solutions are similar and are not described herein again.

The apparatus in this embodiment adds a resource sharing object to a path computation request sent to a PCE, so as to declare an object that needs to be shared; and the PCE computes a path according to the resource sharing object, that is, when computing the path, the PCE may reuse an original link resource or a link resource in a fault-free section in a faulty path. In this way, link resource utilization can be improved, and in a scenario of few available link resources in a network, a path computation success rate can be improved.

The apparatus in the foregoing embodiment may be applied to a scenario in which a first path from a head node to a last node fails. Because a sharing policy is used, for example, a path computation request requires that a fault-free link in the first path be shared, so that during computation, the PCE can preferentially consider a choice from routes shared with a specified object, and return a computation result; when the sharing policy cannot be met, but there is still an available resource between the head node and the last node (a source node and a sink node), return a computation result of non-sharing; and when a requirement for a resource between the source node and the sink node cannot be met regardless of whether the sharing policy is met, return a result indicating a path computation failure.

Further, the path computation request may further include an include route object IRO. The IRO refers to an object that is "necessarily included". The solution may be applied to a scenario of switchback to an original link after rerouting. For example, the network path computation apparatus in this embodiment may periodically send a path computation request to a PCE, and set the IRO as a link of the first path. In this way, the PCE can obtain a result indicating a path computation success only when a fault in the first path is rectified.

Figure 7:
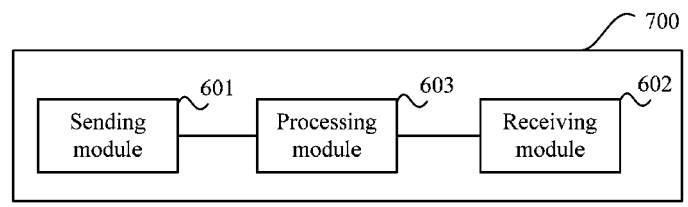
FIG. 7 is a schematic structural diagram of Embodiment 2 of a network path computation apparatus according to the present invention.

FIG. 7 is a schematic structural diagram of Embodiment 2 of a network path computation apparatus according to the present invention. The network path computation apparatus in this embodiment may be disposed on a first node, or may be a first node itself. As shown in FIG. 7, on the basis of the embodiment shown in FIG. 6, an apparatus 700 in this embodiment may further include a processing module 603, where the processing module 603 is configured to determine, before a first node sends a path computation request to a path computation element PCE, that at least one link in a first label switched path LSP between a current head node and a current last node fails.

Further, the apparatus in the embodiment shown in FIG. 6 or FIG. 7 may also be applied to a multi-layer network scenario. A multi-layer network is an application of a transport network nowadays. Typical scenarios include an IP layer, an optical layer, and the like. In the multi-layer network scenario, the IP layer and the optical layer each have a PCE that is responsible for path computation.

When the apparatus is applied to the multi-layer network scenario, specifically, the head node and the last node belong to a first-layer network, the first LSP between the head node and the last node includes at least one link that belongs to a second-layer network, and a head node of the link of the second-layer network is a third node.

The second path further includes the at least one link in the second-layer network.

The processing module 603 is further configured to mark the third path as a third LSP, and the sending module is further configured to send, to the third node, information indicating that the second path is marked as a second LSP, so that the third node sends a report message to a second PCE in the second-layer network after marking the link of the second-layer network as the third LSP, where the report message includes a mapping relationship indicating that the third LSP and the second LSP serve a same service.

In this way, based on the mapping relationship indicating that the third LSP and the second LSP serve the same service, in a subsequent cross-layer path computation process, if a specified shared object is the second LSP, a PCE in a network on another side may determine a shared target in the network at this layer according to the mapping relationship, so as to support a sharing policy when a cross-layer path is computed.

The apparatus in this embodiment may be used to execute the technical solution that is executed by the corresponding first node in the method embodiment shown in FIG. 1, FIG. 4, or FIG. 5A and FIG. 5B, and the implementation principles and technical effects of the technical solutions are similar and are not described herein again.

Figure 8:
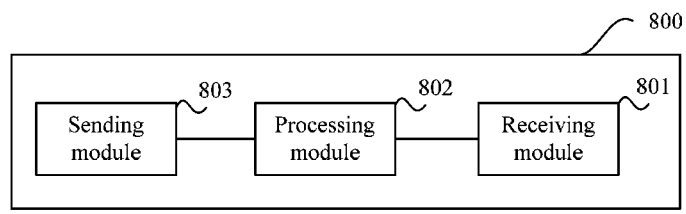
FIG. 8 is a schematic structural diagram of Embodiment 3 of a network path computation apparatus according to the present invention.

FIG. 8 is a schematic structural diagram of Embodiment 3 of a network path computation apparatus according to the present invention. The apparatus in this embodiment may be disposed on a PCE, or may be a PCE itself. The PCE may serve as a PCE in a single-layer network, or may serve as a PCE in a first-layer network of a multi-layer network (which is referred to as a first PCE). As shown in FIG. 8, an apparatus 800 in this embodiment may include: a receiving module 801, a processing module 802, and a sending module 803.

The receiving module 801 is configured to receive a path computation request sent by a first node, where the path computation request includes a resource sharing object, and a head node and a last node of a first label switched path LSP.

The processing module 802 is configured to compute a second path from the head node to the last node according to the resource sharing object.

The sending module 803 is configured to send the second path to the first node, so that the first node establishes the second path from the head node to the last node according to the path computation result.

Further, the resource sharing object includes an identifier of the first label switched path LSP or an identifier of a normal link in the first label switched path LSP.

Further, the resource sharing object further includes a sharing principle.

Further, the sharing principle includes either of the following: sharing as many links as possible is preferred; and a performance parameter is optimal in a case in which link sharing is ensured, where the performance parameter includes but is not limited to a delay, jitter, or a hop count.

Further, the path computation request further includes an include route object IRO.

Further, when the apparatus is applied to a multi-layer network, the processing module 802 is specifically configured to:

determine that a link resource of a first-layer network in which the first node and the second node are located is insufficient to establish the second path; and send, to a second PCE in a second-layer network, a request for establishing a third path, where the request includes the resource sharing object, the third path is used to form the second path, and the third path includes at least one link of the second-layer network.

The apparatus in this embodiment may be used to execute the technical solution that is executed by the corresponding PCE in the method embodiment shown in FIG. 1, or the technical solution that is executed by the corresponding first PCE in the method embodiment shown in FIG. 3A and FIG. 3B, or FIG. 5A and FIG. 5B, and the implementation principles of the technical solutions are similar and are not described herein again.

The apparatus in this embodiment adds a resource sharing object to a path computation request sent to a PCE, so as to declare an object that needs to be shared; and the PCE computes a path according to the resource sharing object, that is, when computing the path, the PCE may reuse an original link resource or a link resource in a fault-free section in a faulty path. In this way, link resource utilization can be improved, and in a scenario of few available link resources in a network, a path computation success rate can be improved.

Figure 9:
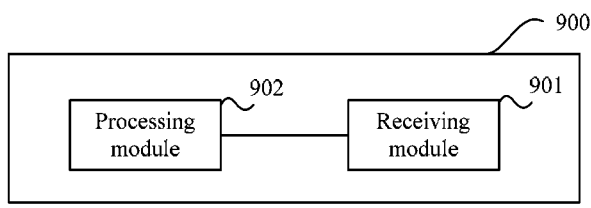
FIG. 9 is a schematic structural diagram of Embodiment 4 of a network path computation apparatus according to the present invention.

FIG. 9 is a schematic structural diagram of Embodiment 4 of a network path computation apparatus according to the present invention. The apparatus in this embodiment may be disposed on a PCE, or may be a PCE itself. The PCE may serve as a PCE in a single-layer network, or may serve as a PCE in a second-layer network of a multi-layer network (which is referred to as a second PCE). As shown in FIG. 9, an apparatus 900 in this embodiment may include: a receiving module 901 and a processing module 902.

The receiving module 901 is configured to receive a request for establishing a third path that is sent by a first PCE in a first-layer network, where the request includes the resource sharing object, and a head node and a last node in a second-layer network, the third path is used to form a second path, the third path includes at least one link of the second-layer network, and the second path further includes at least one link of the first-layer network.

The processing module 902 is configured to determine a shared target according to the resource sharing object and a mapping relationship between a link resource of the second-layer network and a link resource of the first-layer network, and determine the third path according to the shared target.

The apparatus in this embodiment may be used to execute the technical solution that is executed by the corresponding second PCE in the method embodiment shown in FIG. 3A and FIG. 3B, and the implementation principles and technical effects of the technical solutions are similar and are not described herein again.

Further, in another scenario, for example, when a cross-layer path is established for the first time, the receiving module 901 is further configured to receive, before the second PCE determines the shared target according to the resource sharing object and the mapping relationship between the link resource of the first-layer network and the link resource of the second-layer network, a request for establishing a fourth path that is sent by the first PCE, where the fourth path is used to form a first path, the fourth path includes at least one link of the second-layer network, a head node of the second-layer network in the fourth path is a third node, and the first path further includes at least one link of the first-layer network.

The processing module 902 is further configured to determine the fourth path according to the request, and return, to the first PCE, a message indicating that the fourth path is successfully computed.

The processing module 902 is further configured to establish the fourth path, where the fourth path is marked as a fourth LSP.

The receiving module 901 is further configured to receive a report message sent by the third node, where the report message includes information indicating that the first path is marked as a first LSP.

The processing module 902 is further configured to establish a mapping relationship indicating that the fourth LSP and the first LSP serve a same service, or the receiving module 901 is further configured to receive a mapping relationship that is sent by the third node and that indicates that the fourth LSP and the first LSP corresponding to the first path serve a same service.

Further, the mapping relationship between the link resource of the first-layer network and the link resource of the second-layer network is stored in an LSP database of the second-layer network.

The network path computation apparatus in the foregoing solution may be used to execute the technical solution that is executed by the corresponding second PCE in the method embodiment shown in FIG. 5A and FIG. 5B, and the implementation principles and technical effects of the technical solutions are similar and are not described herein again.

The apparatus in this embodiment adds a resource sharing object to a path computation request sent to a PCE, so as to declare an object that needs to be shared; and the PCE computes a path according to the resource sharing object, that is, when computing the path, the PCE may reuse an original link resource or a link resource in a fault-free section in a faulty path. In this way, link resource utilization can be improved, and in a scenario of few available link resources in a network, a path computation success rate can be improved.

Figure 10:
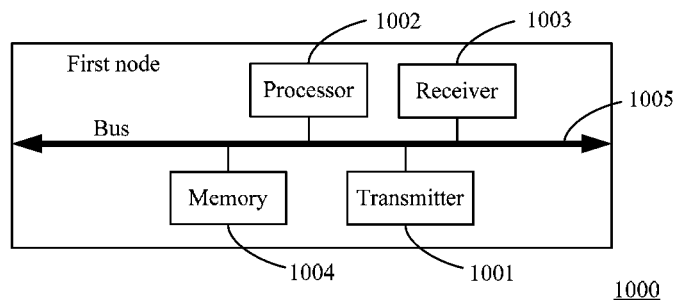
FIG. 10 is a schematic structural diagram of an embodiment of a first node according to the present invention.

FIG. 10 is a schematic structural diagram of an embodiment of a first node according to the present invention. The first node may be a head node of a path, or may be another PCC. As shown in FIG. 10, a first node 1000 in this embodiment may include: a transmitter 1001, a processor 1002, and a receiver 1003. The figure further shows a memory 1004 and a bus 1005. The transmitter 1001, the processor 1002, the receiver 1003, and the memory 1004 are connected and perform mutual communication by using the bus 1005.

The bus 1005 may be an industry standard architecture (ISA) bus, a peripheral component interconnect (PCI) bus, an extended industry standard architecture (EISA) bus, or the like. The bus 1005 may be categorized into an address bus, a data bus, a control bus, and the like. For ease of denotation, the bus is indicated by using only one thick line in FIG. 10, which, however, does not indicate that there is only one bus or only one type of bus.

The memory 1004 is configured to store executable program code, where the program code includes a computer operation instruction. The memory 1004 may include a high-speed RAM memory, and may further include a non-volatile memory (non-volatile memory), for example, at least one disk memory.

The processor 1002 may be a central processing unit CPU), or an application-specific integrated circuit (ASIC), or be configured as one or more integrated circuits that implement this embodiment of the present invention.

The transmitter 1001 may be configured to send a path computation request to a first path computation element PCE, where the path computation request includes a resource sharing object, and a head node and a last node of a first label switched path LSP.

The receiver 1002 may be configured to receive a path computation result that is returned by the first PCE and that is obtained by means of computation according to the resource sharing object, and establish a second path from the head node to the last node according to the path computation result.

Further, the resource sharing object includes an identifier of the first label switched path LSP or an identifier of a normal link in the first label switched path LSP.

Further, the resource sharing object further includes a sharing principle.

Further, the sharing principle includes either of the following: sharing as many links as possible is preferred; and a performance parameter is optimal in a case in which link sharing is ensured, where the performance parameter includes but is not limited to a delay, jitter, or a hop count.

The first node in this embodiment adds a resource sharing object to a path computation request sent to a PCE, so as to declare an object that needs to be shared; and the PCE computes a path according to the resource sharing object, that is, when computing the path, the PCE may reuse an original link resource or a link resource in a fault-free section in a faulty path. In this way, link resource utilization can be improved, and in a scenario of few available link resources in a network, a path computation success rate can be improved.

The apparatus in the foregoing embodiment may be applied to a scenario in which a first path from a head node to a last node fails. Because a sharing policy is used, for example, a path computation request requires that a fault-free link in the first path be shared, so that during computation, the PCE can preferentially consider a choice from routes shared with a specified object, and return a computation result; when the sharing policy cannot be met, but there is still an available resource between the head node and the last node (a source node and a sink node), return a computation result of non-sharing; and when a requirement for a resource between the source node and the sink node cannot be met regardless of whether the sharing policy is met, return a result indicating a path computation failure.

Further, the path computation request may further include an include route object IRO. The IRO refers to an object that is "necessarily included". The solution may be applied to a scenario of switchback to an original link after rerouting. For example, the network path computation apparatus in this embodiment may periodically send a path computation request to a PCE, and set the IRO as a link of the first path. In this way, the PCE can obtain a result indicating a path computation success only when a fault in the first path is rectified.

Further, the processor 1003 may be configured to determine, before the first node sends the path computation request to the path computation element PCE, that at least one link in a first label switched path LSP between a current head node and a current last node fails.

Further, the first node in this embodiment may also be applied to a multi-layer network scenario. A multi-layer network is an application of a transport network nowadays.

Typical scenarios include an IP layer, an optical layer, and the like. In the multi-layer network scenario, the IP layer and the optical layer each have a PCE that is responsible for path computation.

When the first node is applied to the multi-layer network scenario, specifically, the head node and the last node belong to a first-layer network, the first LSP between the head node and the last node includes at least one link that belongs to a second-layer network, and a head node of the link of the second-layer network is a third node.

The second path further includes the at least one link in the second-layer network.

The processor 1003 is further configured to mark the third path as a third LSP, and the transmitter 1001 is further configured to send, to the third node, information indicating that the second path is marked as a second LSP, so that the third node sends a report message to a second PCE in the second-layer network after marking the link of the second-layer network as the third LSP, where the report message includes a mapping relationship indicating that the third LSP and the second LSP serve a same service.

In this way, based on the mapping relationship indicating that the third LSP and the second LSP serve the same service, in a subsequent cross-layer path computation process, if a specified shared object is the second LSP, a PCE in a network on another side may determine a shared target in the network at this layer according to the mapping relationship, so as to support a sharing policy when a cross-layer path is computed.

The first node in this embodiment may be used to execute the technical solution that is executed by the corresponding first node in the method embodiment shown in FIG. 1, FIG. 4, or FIG. 5A and FIG. 5B, and the implementation principles and technical effects of the technical solutions are similar and are not described herein again.

Figure 11:
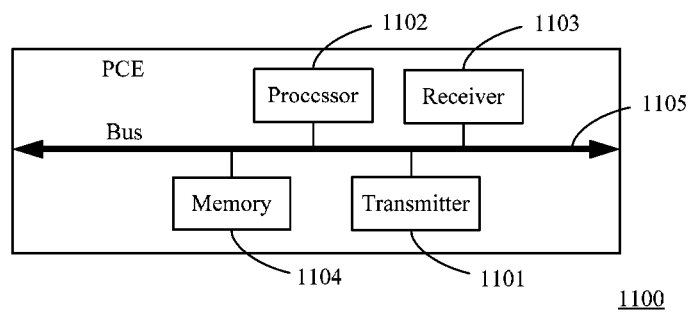
FIG. 11 is a schematic structural diagram of Embodiment 1 of a PCE according to the present invention.

FIG. 11 is a schematic structural diagram of Embodiment 1 of a PCE according to the present invention. The PCE may be a PCE in a single-layer network, or may be a PCE in a network at a specific layer of a multi-layer network. In a cross-layer path scenario, the PCE is a PCE in a first-layer network (which is referred to as a first PCE), such as a PCE in an IP layer network. As shown in FIG. 11, a PCE 1100 in this embodiment may include: a transmitter 1101, a processor 1102, and a receiver 1103. The figure further shows a memory 1104 and a bus 1105. The transmitter 1101, the processor 1102, the receiver 1103, and the memory 1104 are connected and perform mutual communication by using the bus 1105.

The bus 1105 may be an industry standard architecture (ISA) bus, a peripheral component interconnect (PCI) bus, an extended industry standard architecture (EISA) bus, or the like. The bus 1105 may be categorized into an address bus, a data bus, a control bus, and the like. For ease of denotation, the bus is indicated by using only one thick line in FIG. 11, which, however, does not indicate that there is only one bus or only one type of bus.

The memory 1104 is configured to store executable program code, where the program code includes a computer operation instruction. The memory 1104 may include a high-speed RAM memory, and may further include a non-volatile memory (non-volatile memory), for example, at least one disk memory.

The processor 1102 may be a central processing unit (CPU), or an application-specific integrated circuit (ASIC), or be configured as one or more integrated circuits that implement this embodiment of the present invention.

The receiver 1103 is configured to receive a path computation request sent by a first node, where the path computation request includes a resource sharing object, and a head node and a last node of a first label switched path LSP.

The processor 1102 is configured to compute a second path from the head node to the last node according to the resource sharing object.

The transmitter 1101 is configured to send the second path to the first node, so that the first node establishes the second path from the head node to the last node according to the path computation result.

Further, the resource sharing object includes an identifier of the first label switched path LSP or an identifier of a normal link in the first label switched path LSP.

Further, the resource sharing object further includes a sharing principle.

Further, the sharing principle includes either of the following: sharing as many links as possible is preferred; and a performance parameter is optimal in a case in which link sharing is ensured, where the performance parameter includes but is not limited to a delay, jitter, or a hop count.

Further, the path computation request further includes an include route object IRO.

Further, when a technology in the present invention is applied to a multi-layer network (a cross-layer path scenario), the processor 1102 may be specifically configured to:

determine that a link resource of a first-layer network in which the first node and the second node are located is insufficient to establish the second path; and send, to a second PCE in a second-layer network, a request for establishing a third path, where the request includes the resource sharing object, the third path is used to form the second path, and the third path includes at least one link of the second-layer network.

The apparatus in this embodiment may be used to execute the technical solution that is executed by the corresponding PCE in the method embodiment shown in FIG. 1, or the technical solution that is executed by the corresponding first PCE in the method embodiment shown in FIG. 3A and FIG. 3B, or FIG. 5A and FIG. 5B, and the implementation principles of the technical solutions are similar and are not described herein again.

The apparatus in this embodiment adds a resource sharing object to a path computation request sent to a PCE, so as to declare an object that needs to be shared; and the PCE computes a path according to the resource sharing object, that is, when computing the path, the PCE may reuse an original link resource or a link resource in a fault-free section in a faulty path. In this way, link resource utilization can be improved, and in a scenario of few available link resources in a network, a path computation success rate can be improved.

Figure 12:
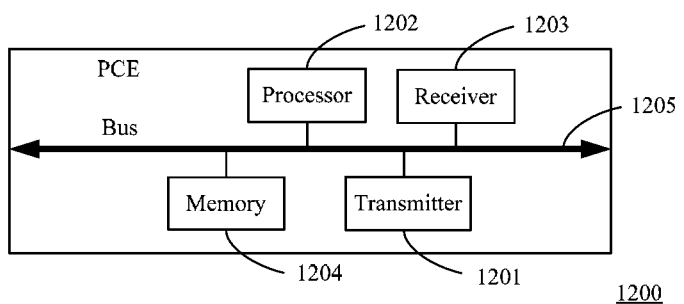
FIG. 12 is a schematic structural diagram of Embodiment 2 of a PCE according to the present invention.

FIG. 12 is a schematic structural diagram of Embodiment 2 of a PCE according to the present invention. The PCE may be a PCE in a single-layer network, or may be a PCE in a network at a specific layer of a multi-layer network. In a cross-layer path scenario, the PCE is a PCE in a second-layer network (which is referred to as a second PCE), such as a PCE in an optical layer network. As shown in FIG. 12, a PCE 1200 in this embodiment may include: a transmitter 1201, a processor 1202, and a receiver 1203. The figure further shows a memory 1204 and a bus 1205. The transmitter 1201, the processor 1202, the receiver 1203, and the memory 1204 are connected and perform mutual communication by using the bus 1205.

The bus 1205 may be an industry standard architecture (ISA) bus, a peripheral component interconnect (PCI) bus, an extended industry standard architecture (EISA) bus, or the like. The bus 1205 may be categorized into an address bus, a data bus, a control bus, and the like. For ease of denotation, the bus is indicated by using only one thick line in FIG. 12, which, however, does not indicate that there is only one bus or only one type of bus.

The memory 1204 is configured to store executable program code, where the program code includes a computer operation instruction. The memory 1204 may include a high-speed RAM memory, and may further include a non-volatile memory (non-volatile memory), for example, at least one disk memory.

The processor 1202 may be a central processing unit (CPU), or an application-specific integrated circuit (ASIC), or be configured as one or more integrated circuits that implement this embodiment of the present invention.

The receiver 1203 is configured to receive a request for establishing a third path that is sent by a first PCE in a first-layer network, where the request includes a resource sharing object, the third path is used to form a second path, the third path includes at least one link of a second-layer network, and the second path further includes at least one link of the first-layer network.

The processor 1202 is configured to determine a shared target according to the resource sharing object and a mapping relationship between a link resource of the second-layer network and a link resource of the first-layer network, and determine the third path according to the shared target.

The PCE in this embodiment may be used to execute the technical solution that is executed by the corresponding second PCE in the method embodiment shown in FIG. 3A and FIG. 3B, and the implementation principles and technical effects of the technical solutions are similar and are not described herein again.

Further, in another scenario, for example, when a cross-layer path is established for the first time, the receiver 1203 is further configured to receive, before the second PCE determines the shared target according to the resource sharing object and the mapping relationship between the link resource of the first-layer network and the link resource of the second-layer network, a request for establishing a fourth path that is sent by the first PCE, where the fourth path is used to form a first path, the fourth path includes at least one link of the second-layer network, a head node of the second-layer network in the fourth path is a third node, and the first path further includes at least one link of the first-layer network.

The processor 1202 is further configured to determine the fourth path according to the request, and return, to the first PCE, a message indicating that the fourth path is successfully computed.

The processor 1202 is further configured to establish the fourth path, where the fourth path is marked as a fourth LSP.

The receiver 1203 is further configured to receive a report message sent by the third node, where the report message includes information indicating that the first path is marked as a first LSP.

The processor 1202 is further configured to establish a mapping relationship indicating that the fourth LSP and the first LSP serve a same service, or the receiver 1203 is further configured to receive a mapping relationship that is sent by the third node and that indicates that the fourth LSP and the first LSP corresponding to the first path serve a same service.

Further, the mapping relationship between the link resource of the first-layer network and the link resource of the second-layer network is stored in an LSP database of the second-layer network.

The network path computation apparatus in the foregoing solution may be used to execute the technical solution that is executed by the corresponding second PCE in the method embodiment shown in FIG. 5A and FIG. 5B, and the implementation principles and technical effects of the technical solutions are similar and are not described herein again.

The apparatus in this embodiment adds a resource sharing object to a path computation request sent to a PCE, so as to declare an object that needs to be shared; and the PCE computes a path according to the resource sharing object, that is, when computing the path, the PCE may reuse an original link resource or a link resource in a fault-free section in a faulty path. In this way, link resource utilization can be improved, and in a scenario of few available link resources in a network, a path computation success rate can be improved.

Figure 13:
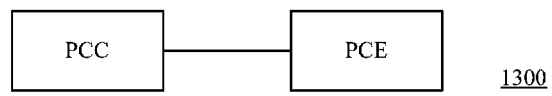
FIG. 13 is a schematic structural diagram of Embodiment 1 of a network path computation system according to the present invention.

FIG. 13 is a schematic structural diagram of Embodiment 1 of a network path computation system according to the present invention. As shown in FIG. 13, a system 1300 in this embodiment may include: a PCC in which the network path computation apparatus in the embodiment shown in FIG. 6 or FIG. 7 is disposed and a PCE in which the network path computation apparatus in the embodiment shown in FIG. 8 is disposed; or a system 1300 in this embodiment may include the first node (that is, a PCC) in the embodiment shown in FIG. 10 and the PCE in the embodiment shown in FIG. 11.

The network path computation system in this embodiment may be applied to path computation in a single-layer network, or may be applied to path computation in a network at each layer of a multi-layer network. The system in this embodiment may be used to execute the technical solution of the method embodiment shown in FIG. 1, and the implementation principles and technical effects of the technical solutions are similar and are not described herein again.

Figure 14:
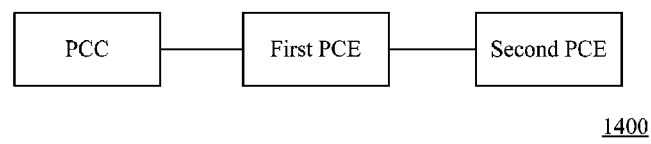
FIG. 14 is a schematic structural diagram of Embodiment 2 of a network path computation system according to the present invention.

FIG. 14 is a schematic structural diagram of Embodiment 2 of a network path computation system according to the present invention. As shown in FIG. 14, a system 1400 in this embodiment may include: a PCC in which the network path computation apparatus in the embodiment shown in FIG. 6 or FIG. 7 is disposed, a first PCE that is located in a first-layer network and in which the network path computation apparatus in the embodiment shown in FIG. 8 is disposed, and a second PCE that is located in a second-layer network and in which the network path computation apparatus in the embodiment shown in FIG. 9 is disposed; or a system 1400 in this embodiment may include: the first node (that is, a PCC) in the embodiment shown in FIG. 10, the PCE (serving as a first PCE) in the embodiment shown in FIG. 11, and the PCE (serving as a second PCE) in the embodiment shown in FIG. 12.

The network path computation system in this embodiment may be applied to path computation in a multi-layer network, or may be applied to computation of a cross-layer path in the multi-layer network. The system in this embodiment may be used to execute the technical solution of the method embodiment shown in FIG. 3A and FIG. 3B or FIG. 4, and the implementation principles and technical effects of the technical solutions are similar and are not described herein again.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A network path computation method comprising:
   sending, by a first node, a path computation request to a first path computation element (PCE),
      wherein the path computation request comprises a sharing policy specifying sharing the most number of links from a first label switched path (LSP), a head node and a second node, which is a last node, and an identifier of either (a) the first LSP or (b) a normal link in the first LSP;
   receiving, by the first node, a path computation result returned by the first PCE, wherein the path computation result is obtained according to the sharing policy and the identifier; and
   establishing, by the first node, a second LSP from the head node to the last node according to the path computation result, thereby maintaining the most links from the first LSP in the second LSP,
      wherein the head node and the last node belong to a first-layer network, the first LSP between the head node and the last node comprises at least one link that belongs to a second-layer network, a head node of the link of the second-layer network is a third node, and the second LSP further comprises at least one link in the second-layer network; and
   sending, by the first node, to the third node, information causing the third node to send a report message to a second PCE in the second-layer network after marking the at least one link in the second-layer network as a third LSP, wherein the report message comprises a mapping relationship indicating that the third LSP and the second LSP serve a common service.

2. The method according to claim 1, before sending the path computation request to the first PCE, the method further comprising:
   determining, by the first node, a failure of at least one link in the first LSP between a current head node and a current last node.

3. The method according to claim 1, wherein the sharing policy and the identifier are carried by a resource sharing object (RSO).

4. The method according to claim 1, wherein the first LSP and the second LSP have different source nodes and different destination nodes.

5. The method according to claim 1, wherein the first LSP and the second LSP have different source nodes or destination nodes.

6. A network path computation apparatus comprising:
   a processor; and
   a non-transitory computer readable medium having a plurality of computer executable instructions that, when executed by the processor, cause the processor to perform operations comprising:
      sending a path computation request to a first path computation element (PCE), wherein the path computation request comprises a sharing policy specifying sharing the most number of links from a first label switched path (LSP), a head node and a second node, which is a last node, and an identifier of either (a) the first LSP or (b) a normal link in the first LSP;
      receiving a path computation result returned by the first PCE, wherein the path computation result is obtained according to the sharing policy and the identifier;
      establishing a second LSP from the head node to the last node according to the path computation result, thereby maintaining the most links from the first LSP in the second LSP,
         wherein the head node and the last node belong to a first-layer network, the first LSP between the head node and the last node comprises at least one link that belongs to a second-layer network, a head node of the link of the second-layer network is a third node, the second LSP further comprises at least one link in the second-layer network; and
      sending, to the third node, information causing the third node to send a report message to a second PCE in the second-layer network after marking the at least one link in the second-layer network as a third LSP, wherein the report message comprises a mapping relationship indicating that the third LSP and the second LSP serve a common service.

7. The apparatus according to claim 6, wherein the processor is configured with processor-executable instructions to perform operations further comprising:
   determining, before the operation of sending the path computation request to the first PCE, a failure of at least one link in the first LSP between a current head node and a current last node.

8. A network path computation method comprising:
   determining, by a first node, a failure of at least one link in a first label switched path (LSP) between a current head node and a current last node, wherein a head node and a last node belong to a first-layer network;
   sending, by the first node, a path computation request to a first path computation element (PCE),
      wherein the path computation request comprises a resource sharing object (RSO) and the head and last nodes, and
      wherein the RSO comprises a sharing policy specifying sharing the most number of links from the first LSP and an identifier of either (a) the first LSP or (b) a normal link in the first LSP;
   receiving, by the first node, a path computation result returned by the first PCE, wherein the path computation result is obtained according to the sharing policy and the identifier;
   establishing, by the first node, a second LSP from the head node to the last node according to the path computation result, thereby maintaining the most links from the first LSP in the second LSP,
      wherein the first LSP between the head node and the last node comprises at least one link belonging to a second-layer network,
      wherein a head node of the at least one link belonging to the second-layer network is a third node, and
      wherein the second LSP further comprises at least one link in the second-layer network; and
   sending, by the first node, information to the third node, causing the third node to send a report message to a second PCE in the second-layer network after marking the at least one link in the second-layer network as a third LSP,
   wherein the report message comprises a mapping relationship indicating that the second and third LSPs serve a common service.

9. The method according to claim 8, wherein the first LSP and the second LSP have different source nodes and different destination nodes.

10. The method according to claim 8, wherein the first LSP and the second LSP have different source nodes or destination nodes.

11. A system comprising a first node and a first path computation element (PCE), wherein
   the first node is configured to send a path computation request to the first PCE,
      wherein the path computation request comprises a sharing policy specifying sharing the most number of links from a first label switched path (LSP), a head node and a second node, which is a last node, and an identifier of either (a) the first LSP or (b) a normal link in the first LSP;
   the first PCE is configured to determine a second LSP from the head node to the last node according to the sharing policy and the identifier and send the second LSP to the first node;
   the first node is further configured to establish a second LSP from the head node to the last node according to the path computation result, thereby maintaining the most links from the first LSP in the second LSP,
   wherein the head node and the last node belong to a first-layer network, the first LSP between the head node and the last node comprises at least one link that belongs to a second-layer network, a head node of the link of the second-layer network is a third node, and the second LSP further comprises at least one link in the second-layer network; and
   the first node is further configured to send, to the third node, information causing the third node to send a report message to a second PCE in the second-layer network after marking the at least one link in the second-layer network as a third LSP, wherein the report message comprises a mapping relationship indicating that the third LSP and the second LSP serve a common service.

12. The system according to claim 11, wherein before sending the path computation request to the first PCE, the first node is further configured to determine a failure of at least one link in the first LSP between a current head node and a current last node.

13. The system according to claim 11, wherein the sharing policy and the identifier are carried by a resource sharing object (RSO).

14. The system according to claim 11, wherein the first LSP and the second LSP have different source nodes and different destination nodes.

15. The system according to claim 11, wherein the first LSP and the second LSP have different source nodes or destination nodes.

* * * * *